United States Patent [19]

Suzuki

[11] Patent Number: 4,634,835
[45] Date of Patent: Jan. 6, 1987

[54] ANTI-DAZZLE DEVICE FOR A REARVIEW MIRROR OF A MOTOR VEHICLE

[75] Inventor: Masaru Suzuki, Chiryu, Japan

[73] Assignee: Kabushiki Kaisha Tokai Denki Seisakusha, Aichi, Japan

[21] Appl. No.: 761,569

[22] Filed: Aug. 1, 1985

[30] Foreign Application Priority Data

Aug. 1, 1984 [JP] Japan .................................. 59-163339

[51] Int. Cl.⁴ ............................................. H05B 3/36
[52] U.S. Cl. .................................... 219/219; 350/351; 219/202
[58] Field of Search .............. 219/219, 200, 201, 202, 219/203, 548; 350/351, 331 R, 331 T

[56] References Cited

U.S. PATENT DOCUMENTS

| 3,585,381 | 6/1971 | Hodson | 350/351 |
|---|---|---|---|
| 3,614,210 | 10/1971 | Caplan | 350/331 R |
| 3,798,419 | 3/1974 | Maake | 219/549 |
| 3,898,977 | 8/1975 | Draper | 350/351 |
| 3,961,181 | 6/1976 | Golden | 350/331 |
| 4,061,417 | 12/1977 | Katagiri | 350/351 |
| 4,132,464 | 1/1979 | Maeno | 350/351 |
| 4,200,361 | 4/1980 | Malvano | 350/331 R |
| 4,201,451 | 5/1980 | Jacob | 350/331 R |
| 4,274,713 | 6/1981 | Krueger | 350/331 R |
| 4,456,335 | 6/1984 | Mumford | 350/331 R |

FOREIGN PATENT DOCUMENTS

| 2732727 | 3/1978 | Fed. Rep. of Germany ... | 350/331 R |
|---|---|---|---|
| 57-102603 | 6/1982 | Japan | 350/331 R |

Primary Examiner—E. A. Goldberg
Assistant Examiner—Teresa J. Walberg
Attorney, Agent, or Firm—Price, Gess & Ubell

[57] ABSTRACT

An anti-dazzle device for a rearview mirror of a motor vehicle, wherein a mirror face member is provided with an electric heater and a film layer containing a heat-sensitive color-changing material which becomes not transparent when it is heated by the heater, whereby the mirror face member can be easily prevented from being dazzled by the activation of the heater.

8 Claims, 4 Drawing Figures

ANTI-DAZZLE DEVICE FOR A REARVIEW MIRROR OF A MOTOR VEHICLE

BACKGROUND OF THE INVENTION

1. Field of the Invention

The present invention relates to a dazzle-proof or an anti-dazzle device for a rearview mirror of a motor vehicle which is designed to prevent or minimize disturbances or a dazzle effect in the field of the rearward vision caused when the rearview mirror, such as an inner mirror or a door mirror, reflects light coming from a headlight of a following motor vehicle in the night.

2. Description of the Prior Art

For preventing dazzles of this kind, there has been employed, for example, a prism mirror with respect to the inner mirror, the inclination of the angle of which is switched during the daytime from that in the night so as to change the reflecting ratio thereof. This inner mirror employing the prism mirror is, however, inconvenient because it is troublesome to switch the inclination angle between the daytime and the night. On the other hand, another proposal, that a mirror face member be covered with a liquid crystal layer has been made in recent years to prevent a dazzle effect. However, this proposal is also inconvenient since it is difficult to make the liquid crystal layer uniform in thickness, and moreover, the use of the liquid crystal by itself considerably increases the manufacturing cost of the mirror, for example, as much as 10 to 15 times when compared with the case where the above-described prism mirror is used.

SUMMARY OF THE INVENTION

The present invention has been developed with a view to substantially solving the above-described inconveniences inherent in the prior art anti-dazzle devices and, has for its essential object to provide an improved anti-dazzle device which can, without requiring a remarkable increase in manufacturing cost and by a simple and easy operation, prevent the dazzle effect.

It is another object of the present invention to provide a anti-dazzle device of the type referred to above which can remove blurs on the mirror.

In accomplishing these and other objects of the present invention, there is provided an improved anti-dazzle device for a rearview mirror of a motor vehicle comprising an electric heater attached to the rear surface of a mirror face member in such a manner as to be able to be power-supplied from a battery source, and a film layer including a heat-sensitive color-changing material applied to the front surface or the intermediate portion of said mirror face member, said heat-sensitive color-changing material being transparent or so dim a color that light can easily pass through at normal temperatures, while it being translucent or so dark a color that the light is difficult to pass through, characterized in that said electric heater is so constructed as to be switched by an operating switch provided near a driver's seat for connection either to a contact circuit connected to a battery circuit for removal of blurs on the mirror in the daytime, or to a contact circuit connected to a headlight turning circuit in the night.

BRIEF DESCRIPTION OF THE DRAWINGS

These and other objects and features of the present invention will become apparent from the following description taken in conjunction with the preferred embodiments thereof with reference to the accompanying drawings, in which.

DESCRIPTION OF THE PREFERRED EMBODIMENTS

Figure 1:
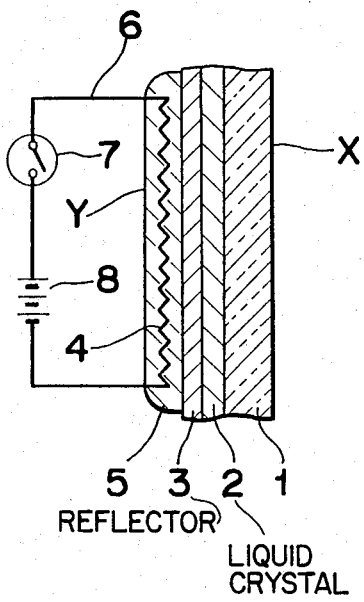
FIG. 1 shows a cross-sectional view of a rearview mirror of a motor vehicle provided with an anti-dazzle device according to one preferred embodiment of the present invention.

Before the description proceeds, it is to be noted that like parts are designated by like reference numerals throughout the accompanying drawings.

Referring to FIG. 1, there is shown a cross-sectional view of a rearview mirror of a motor vehicle. Reference X shows the front side of the mirror, with reference Y representing the rear side thereof. A mirror face member is comprised of a transparent glass 1 and a metal reflective film 3. Between the transparent glass 1 and the metal reflective film 3 is interposed a film layer 2 which includes a heat-sensitive color-changing material. In addition, a heat support member 5 having an electric heater 4 accommodated therein is attached to the rear face of the metal reflective film 3. The electric heater 4 is connected to a battery source 8 through a leading wire 6, such that it can be power-supplied with a supply of electricity through the operation of an operating switch 7 provided in the midst of the circuit. The operating switch 7 is provided near the driver's seat for easy access thereto.

Considering a heat-sensitive color-changing material or a heat-sensitive paint for the above film layer 2, such a material is used so that it is transparent or provides so dim a color as to be able to easily pass light at normal temperatures, and at the same time, becomes translucent or so dark a color as to prevent light from passing through when heated. For example, a cholesteric liquid crystal ($C_{27}H_{45}OCOC_nH_{2n+1}$) is used. The cholesteric liquid crystal changes its color in accordance with the change of temperatures, and the temperature at which the cholesteric liquid crystal changes its color can be selectively determined with respect to the kind of the liquid crystal and the mixing ratio thereof. Moreover, the range of the temperatures in which the cholesteric liquid crystal changes its color is 1°–6° C., with high decomposition ability. Therefore, the cholesteric liquid crystal is favorably employed.

If the cholesteric liquid crystal is arranged in such a manner that it shows a dim red color through which a light can easily pass through at normal temperatures below 35° C., and it changes to a dark purple in the range of the temperatures at 39° C.–44° C., and the electric heater 4 is arranged in such a manner that it is heated up to 40° C. if power-supplied, the cholesteric liquid crystal will change to be a dark purple only when the heater is power-supplied, and it will never change its color so easily simply when the ambiant temperatures rises or by other reasons. The cholesteric liquid crystal is formed into the film layer 2 by mixing the liquid crystal which is not micro-capsuled in a solution of an organic solvent, e.g., cellulose resin, to be applied on the rear surface of the glass 1. The film layer 2 is covered with the metal reflective film 3 on the rear surface thereof, and the metal reflective film 3 is attached with the support member 5 on the rear surface thereof. The support member 5 has the electric heater 4 accommodated therein. Thus, the film layer 2 is heated, through the metal reflective film 3, by the heater 4 from an adjacent position.

In the construction described hereinabove, when the driver becomes dazzled by headlights from the rear in the night, he or she has only to turn on the operating switch 7 to circulate electricity to the heater 4, and consequently, the heat-sensitive color-changing material in the film layer 2 changes to be dark purple, etc., thereby preventing a dazzle effect to the driver.

Figure 2:
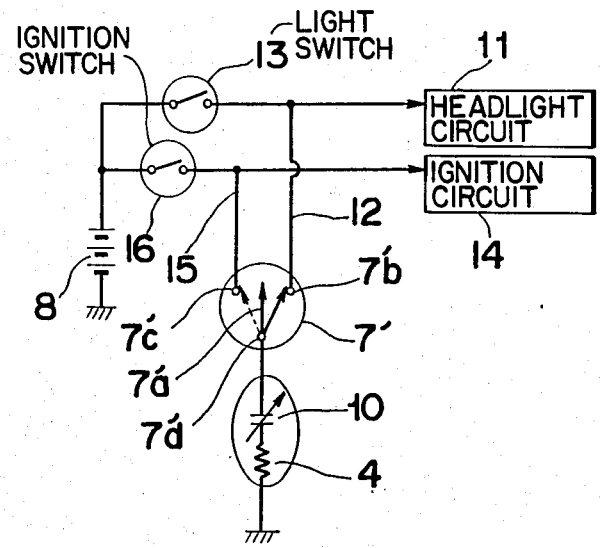
FIG. 2 shows a circuit diagram of a modified example of an electric circuit of a heater employed in the device of FIG. 1.

The present invention is not limited to the foregoing embodiment, but may be arranged that the heater is utilized to remove blurs on the mirror, or the mirror automatically changes its color for the purpose of the prevention of a dazzle effect when the headlight is lit up in the night. More specifically, as shown in FIG. 2, the electric heater 4 is connected through a thermostat 10 to an operating switch 7' which switches the heater for use in prevention of the a dazzle effect or for use in removal of blurs. The operating switch 7' is provided near the driver's seat in the same manner as in the foregoing embodiment. A contact plate 7'a connected to the side of the electric heater 4 is designed to be connected to a contact 7'b for use in prevention of the a dazzle effect or to a contact 7'c for use in removal of blurs, or in a neutral position where it is connected neither to the contact 7'b nor to the contact 7'c. The contact 7'b is connected through a contact circuit 12 to a circuit which connects a headlight lighting circuit 11 with the power source 8 through a light switch 13. When the light switch 13 is turned on to operate the operating switch 7' for use in prevention of a dazzle effect in the night, the electric heater 4 is power-supplied from the battery 8, and thus the film layer 2 changes to be a dark color, thereby prevent the dazzle effect. On the other hand, the contact 7'c is connected through a contact circuit 15 to a circuit connecting the battery 8 with an ignition circuit 14 through an ignition switch 16. When the operating switch 7' is switched for use in removal of blurs in the daytime, the heater 4 is power-supplied to heat the glass, thereby to remove the blurs on the mirror. It is to be noted here that although the film layer 2 changes its color during this time, it is not inconvenient because it takes little time for removal of blurs.

Figure 3:
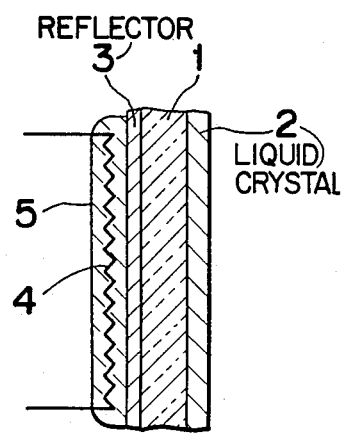
FIGS. 3 and 4 respectively show a cross-sectional view of a rearview mirror of a motor vehicle equipped with an anti-dazzle device according to other embodiments of the present invention.
Figure 4:
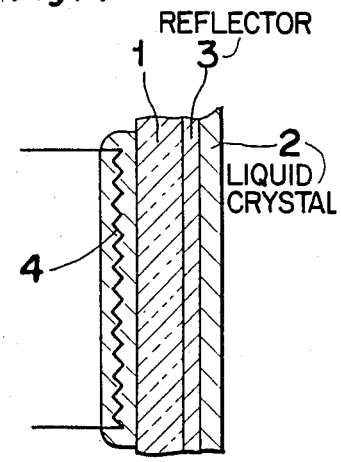

Further, the present invention may be modified in the layer structure of the mirror as shown in FIGS. 3 and 4. In other words, in the case of a rear face mirror according to another embodiment shown in FIG. 3, the front surface of the glass 1 is covered with the film layer 2 containing a heat-sensitive color-changing material, and the rear surface of the glass 1 is covered with the metal reflective film 3 which is further applied on the rear face thereof with the support member 5 having the electric heater 4 accommodated therein. In a further embodiment shown in FIG. 4, that is, in the case of a front face mirror, the front surface of the glass 1 is covered with the metal reflective film 3, the front surface of which is applied with the film layer 2 including a heat-sensitive color-changing material, and at the same time, the rear surface of the glass 1 is attached by the support member 5 accommodating the electric heater therein. The glass 1 in this embodiment works as a supporting means, and therefore, it may be made of plastics and it may not be transparent.

EMBODIMENT 1

The practical specification of a liquid crystal paint employed in the anti-dazzle device for a rearview mirror of a motor vehicle is as follows:

(1) Liquid crystal paint to be used:

Cholesteric liquid crystal ($C_{27}H_{45}OCOC_nH_{2n+1}$) for low temperatures No. $R_{-4}$ specifically, a liquid crystal dispersion paint which is formed in the manner that a micro-capsule containing a cholesteric liquid crystal therein is, after being dried, dispersed into an epoxy resin.

(2) Temperature at which the liquid crystal changes color:

40° C.

(3) Color:

At low temperatures (less than 38° C.)—Reddish yellow

At high temperatures (more than 40° C.)—Red orange (4) Glass temperature:

When the heater is turned off (namely, at low temperatures), −10° C. (in winter)—+35° C. (in summer)

When the heater is turned on (namely, heated at high temperatures), 40° C.–45° C.

(5) Heater efficiency:

In the case of a rearview mirror 12 V, 18 W (1.5 Å)

(6) Structure of a liquid crystal, heater and glass:

As shown in FIG. 1.

As is clear from the foregoing description, in an anti-dazzle device for a rearview mirror of a motor vehicle according to the present invention, an electric heater is attached to the rear surface of a mirror face member of the rearview mirror, which mirror face member is further covered with a film layer containing a heat-sensitive color-changing material, such that said heat-sensitive color-changing material becomes non-transparent or so dark that a light cannot pass through when it is heated by the heater, and therefore, the rearview mirror can be easily prevented from creating a dazzle effect only through circulation of electricity to the electric heater. Moreover, since the anti-dazzle device of the present invention is of the construction that the mirror face member is heated by the heater, it can be used also for removal of blurs on the rearview mirror. Thus, the anti-dazzle device according to the present invention is highly valuable is of practical use, in a simple construction and can be provided without a considerable increase in the manufacturing cost thereof.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An anti-dazzle device for a rearview mirror of a motor vehicle having a driver's seat positioned adjacent the rearview mirror and a headlight lighting circuit comprising:

a mirror member having a reflective mirror layer;

a heat sensitive color-changing film layer applied across the reflective mirror layer;

an electric heater attached to the mirror member for providing heat energy to the heat sensitive film layer, the heat sensitive, color changing layer being transparent or at least so dim a color that light can easily pass through the layer at normal ambient temperatures of the mirror member, while it becomes translucent or so dark a color that light can hardly pass through when it is heated by the heater;

a power source for the heater;

operating switch means provided adjacent the driver's seat for activiating the electric heater; and a contact circuit connected to the power source and connectable to the operating switch means to enable the electric heater at the option of a driver, the operating switch means being operatively connectable to one of the contact circuit and the headlight lighting circuit at the option of the driver.

2. An anti-dazzle device for a rearview mirror of a motor vehicle as claimed in claim 1, wherein a heat-sensitive color-changing material is a cholesteric liquid crystal material.

3. An improved rearview mirror for a driver of a motor vehicle having headlights comprising:

a support surface;

a reflective surface operatively attached to the support surface;

a layer of a color changing material operatively connected to the support surface and interposed between the reflective surface and the driver, the color changing material having the characteristic of a relatively narrow range of temperature in which the color changing material will change color;

means for controlling the change of color including an electrical heater;

a source of power; and a headlight circuit means for connecting the source of power to the head lights and the means for controlling the change of color is connected with the headlight circuit to be activated when the headlights are turned on.

4. The invention of claim 3 wherein the layer of color changing material is applied directly on the reflective surface.

5. The invention of claim 3 wherein the layer of color changing material is applied directly on the support surface.

6. The invention of claim 3 wherein the color changing material is a cholesteric liquid crystal dispersion paint having micro-capsules dispersed in an epoxy resin.

7. The invention of claim 6 wherein the paint changes color at approximately 40° C.

8. The invention of claim 3 wherein the means for controlling includes an electrical resistance heater attached to the support surface.

* * * * *